(12) United States Patent
Dalmasso et al.

(10) Patent No.: US 7,896,312 B2
(45) Date of Patent: Mar. 1, 2011

(54) BALL VALVE WITH REMOVABLE MEANS FOR RETAINING THE AXIAL SEAL

(75) Inventors: Giuseppe Dalmasso, Milan (IT); Roberto Fant, Milan (IT)

(73) Assignee: Cesare Bonetti S.p.A., Milanese (IT)

( * ) Notice: Subject to any disclaimer, the term of this patent is extended or adjusted under 35 U.S.C. 154(b) by 301 days.

(21) Appl. No.: 12/077,460

(22) Filed: Mar. 18, 2008

(65) Prior Publication Data

US 2008/0230731 A1 Sep. 25, 2008

(30) Foreign Application Priority Data

Mar. 20, 2007 (IT) .......................... MI20070093 U

(51) Int. Cl.
*F16K 5/00* (2006.01)
(52) U.S. Cl. .................... 251/316; 251/315.01; 251/363
(58) Field of Classification Search ............ 251/315.01, 251/314, 316, 359, 360, 362, 363
See application file for complete search history.

(56) References Cited

U.S. PATENT DOCUMENTS

| | | | | |
|---|---|---|---|---|
| 3,109,623 A | * | 11/1963 | Bryant | 251/172 |
| 3,301,523 A | * | 1/1967 | Lowrey | 251/172 |
| 3,335,999 A | * | 8/1967 | Lowrey | 251/172 |
| 4,137,936 A | * | 2/1979 | Sekimoto et al. | 137/246.22 |
| 4,155,536 A | | 5/1979 | Saiki | |
| 4,277,047 A | * | 7/1981 | Zinnai | 251/362 |
| 4,673,164 A | * | 6/1987 | Nakanishi et al. | 251/174 |
| 5,170,993 A | * | 12/1992 | Bonetti | 251/368 |

FOREIGN PATENT DOCUMENTS

| | | |
|---|---|---|
| EP | 0 121 946 | 10/1984 |
| FR | 2 527 730 | 12/1983 |
| FR | 2 745 353 | 8/1997 |
| GB | 2 135 431 | 8/1974 |
| JP | 55-63061 | 5/1980 |
| WO | WO 01/38761 | 5/2001 |

* cited by examiner

*Primary Examiner*—John K Fristoe, Jr.
(74) *Attorney, Agent, or Firm*—Polsinelli Shughart PC; Timothy J. Keefer; Paul A. Jenny

(57) ABSTRACT

A ball valve comprising:
a valve body with a seat for housing a ball provided with a coaxial through-opening and able to be rotationally operated from a closed valve position into an open valve position and vice versa;
two opposite end flanges which are constrained to the valve body on opposite sides of the ball and provided with a respective, coaxial, internal hole and are suitable for connection to respective pipe sections;
sealing means arranged between the valve body and the ball and comprising an annular member which is coaxial with the longitudinal axis (X-X) and carries an axial seal housed inside an associated axial seat inside which it is partially inserted in order to interfere with the outer surface of the ball, comprising a coaxial ring axially constrained to the annular seal-carrying member and interfering in the transverse direction (Y-Y) with a front surface portion of the seal in order to retain the latter in the axial direction.

11 Claims, 1 Drawing Sheet

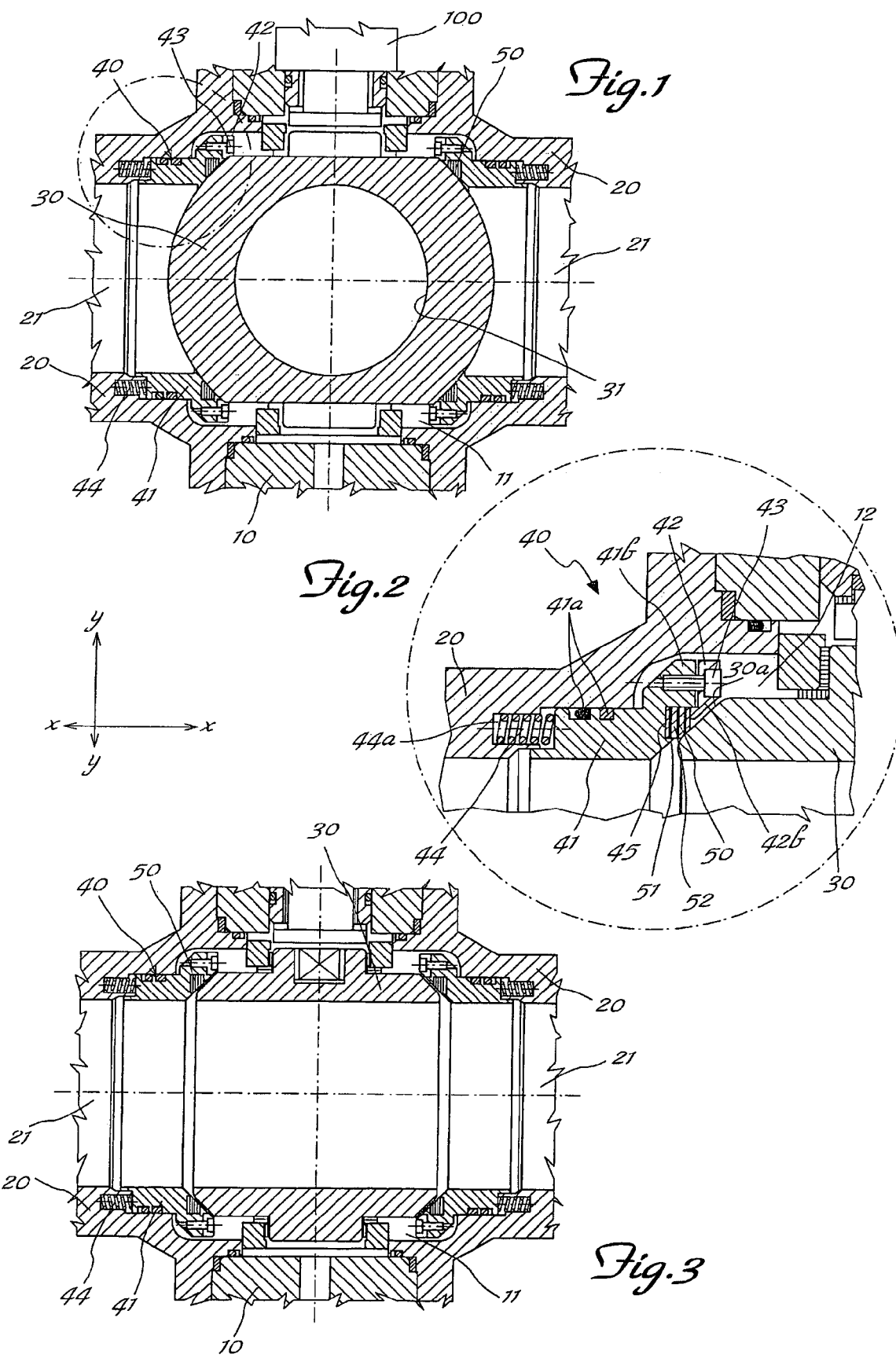

BALL VALVE WITH REMOVABLE MEANS FOR RETAINING THE AXIAL SEAL

The present invention relates to a ball valve provided with removable means for retaining the axial seal of the valve in the axial direction.

It is known in the technical sector relating to the conveying of fluids inside pipes that there exists the need to intercept the latter by means of valves able to connect together two pipe sections and allow/interrupt flowing of the fluid through them.

Particularly relevant in this connection are ball valves where the through-flow/interruption of the flow is achieved by a ball housed in the valve body and provided with a through-hole, having a diameter substantially equivalent to that of the pipes, and able to be rotationally operated from an open position, where the hole is coaxial with the direction of flow, into a closed position, where the hole is transverse to the direction of flow, and where the sealing action between the ball and the pipe is provided by annular seals arranged between the respective facing surfaces making contact with each other.

Among the various types of ball valves in use valves of the so-called "trunnion" or "top entry" type (depending on the assembly method used) are also known, these valves having a sealed chamber between the two seats which contain the sealing parts; said chamber, which is also called a "ball chamber", allows the drainage of any fluid losses also when pressure is present upstream and/or downstream of the ball.

In order to obtain sealing of the ball chamber, these valves envisage a ring, which is coaxially arranged between the valve body and the ball, against which the ring is axially pushed, by resilient means, in order to produce contact between the sealing surface and the ball itself; said sealing surface normally consists of a varyingly formed and/or treated metal surface of the ring or a suitably configured seal which is forced axially into a special seat of the ring.

Although fulfilling their function, these seals nevertheless have drawbacks which limit the practical use thereof in that metal seals are very costly, both owing to the need for hardening treatment of the contact surfaces between the ball and ring which acts as a seat, and owing to the adaptation which is needed in order to ensure perfect mating of the contact surfaces between the ball and the two sealing rings; this treatment needed to ensure mating means that, should even only one of the these components be damaged, all three parts (ball and sealing rings) must be replaced; it must also be added that the presence of solid particles which may be suspended in the process fluid damage very easily the metal sealing surfaces in contact with each other, scratching them and reducing over time duration of a perfect seal in the valve.

Similarly the sealing action provided by means of soft seals made of materials such mixtures of graphite and glass fibres or plastics is impaired by the abrasion which is produced by the same fluid flowing through as well as by the loads exerted on these materials by the thrust resulting from the operating pressure.

These defects become more critical in the case of high-temperature and/or high-pressure applications, which conditions also prevent the use of seals made of plastic owing to the incompatibility of said materials with the high temperatures and/or with the specific high pressures.

The technical problem which is posed, therefore, is to provide a ball valve of the type with a sealed chamber formed between the ball and the valve body, which is not subject to damage resulting from the action of the particles suspended in the fluid which passes through the valve and/or the loads exerted by the thrust of the fluid under pressure, allowing moreover easy replacement even of only one of the seals in the event of wear or damage of the sealing surfaces.

In connection with this problem it is also required that this valve should be able to be used at high temperatures and/or at high operating pressures and be easy and inexpensive to produce and assemble.

These results are achieved according to the present invention by a ball valve comprising:
- a valve body with a seat for housing a ball provided with a coaxial through-opening and able to be rotationally operated from a closed valve position into an open valve position and vice versa;
- two opposite end flanges which are constrained to the valve body on opposite sides of the ball and provided with a respective, coaxial, internal hole and are suitable for connection to respective pipe sections;
- sealing means arranged between the valve body and the ball and comprising an annular member which is coaxial with the longitudinal axis (X-X) and carries an axial seal housed inside an associated axial seat inside which it is partially inserted in order to interfere with the outer surface of the ball, comprising a coaxial ring axially constrained to the annular seal-carrying member and interfering in the transverse direction with a front surface portion of the seal in order to retain the latter in the axial direction.

Further details may be obtained from the following description of a non-limiting example of embodiment of the subject of the present invention provided with reference to the accompanying drawings in which:

FIG. 1 shows a cross-section along a longitudinal vertical plane through the ball valve according to the present invention in the closed position;

FIG. 2 shows a detail, on a larger scale, of the sealing arrangement according to FIG. 1; and FIG. 3 shows a cross-section similar to that of FIG. 1, with the valve in the open condition.

As shown in FIG. 1 and assuming solely for the sake of convenience of the description and without a limiting meaning a pair of reference axes in a longitudinal direction X-X, parallel to the direction of flow, and transverse direction Y-Y, the ball valve according to the present invention, shown by way of example in the drawings as a valve of the trunnion type consisting of three parts, essentially comprises a valve body 10 provided with a seat 11 housing inside it a ball 30 with a coaxial cylindrical opening 31 able to be rotationally operated from a closed valve position (FIG. 1) into an open valve position (FIG. 3) by conventional means schematically indicated by 100.

The valve also comprises two opposite end flanges 20 which are constrained to the valve body 10 on opposite sides of the ball and are suitable for connection to the pipe (not shown) by means of a respective coaxial internal hole 21.

Each flange 20 and the ball 30 have, arranged between them, the sealing means 40 comprising an annular member 41 coaxial with the longitudinal axis X-X and carrying first radial seals 41a able to interfere with the end flanges 20—or generally with the surfaces of the housing of the said annular member—and an axial seal 50 able to interfere with the outer surface 30a of the ball against which it forms a seal, thus forming the sealed ball chamber 12.

The annular seal-carrying member 41 is pushed towards the outer surface 30a of the ball 30 by resilient means 44 which are axially inserted inside a corresponding seat 44a of the end flange 20 against which the springs react.

In single-piece or two-piece valves this seat may be formed in the body itself of the valve.

According to the present invention it is envisaged that said axial seal 50 is housed in an associated axial seat 45 inside which it is partially inserted and inside which it is partially retained by means of a coaxial ring 42 interfering in the transverse direction Y-Y with a front surface portion of the seal 50 in order to retain it in the axial direction; said retaining ring 41 is axially constrained to the annular seal-carrying member 41 by means of screws 43 which are preferably screwed therein.

According to preferred embodiments, it is envisaged that said annular seal-carrying member 41 has a radial extension 41b with a diameter greater than the diameter of the outer surface 30a of the ball 30 interfering with the seal 50, into which extension the screws 43 for fixing the axial retaining ring 42 are screwed so that the head of the screws is positioned inside the ball chamber 12 and outside the dimensions of the sealing surface 30a of the ball 30.

In this way the seal 50 is able to produce a fluid-tight seal both in the axial direction by means of contact with the outer surface of the ball and with the end wall, parallel to the transverse direction Y-Y, of the seat 45 of the annular member 41 against which it makes contact, and a cylindrical circular seal along the coaxial annular surface of the said seat 45 of the annular member.

The ring 42 for retaining the axial seal 50 has in turn an annular body 42a and an outwardly inclined undercut 42b able to be arranged substantially parallel to the tangent of the outer surface 30a of the ball opposite the said undercut 42b.

According to a preferred embodiment, the seal 50 is formed by a series of layers 51 of sheets made of pure graphite reinforced with a stainless-steel strip 52 having a thickness of between a few hundredths and a few tenths of a millimeter, depending on the thrusting forces which are produced on the said seal.

Each stainless-steel reinforcing strip of the seal may be replaced by a strip made of nickel or other materials compatible with the process fluid.

It is therefore clear how, with the valve according to the invention, it is possible to obtain a sealed chamber using a seal which can be easily replaced without operations which damage the various parts, and consequently perform easy and rapid maintenance of the valve in the event of wear of the seal, which may be changed without the need to replace both the seals and the ball; in addition, the replacement of the seal does not require the use of special technology and may therefore be performed also at the end user's premises without having to despatch the valve to the manufacturer.

The axially retained valve according to the invention is also particularly suitable for use at high temperatures and/or high pressures, for fluids also of an abrasive nature and may also be applied to large-diameter valves where the thrusting pressure on the sealing parts is extremely high owing to the greater areas of the thrusting surfaces.

With the valve according to the invention it is also possible to obtain a long working life with a perfect seal referred to in technical jargon of the sector as "bubble-tight" seal.

The invention claimed is:

1. A ball valve comprising:
    a valve body with a seat for housing a ball provided with a coaxial through-opening and able to be rotationally operated from a closed valve position into an open valve position and vice versa;
    two opposite end flanges which are constrained to the valve body on opposite sides of the ball and provided with a respective, coaxial, internal hole and are suitable for connection to respective pipe sections;
    sealing means arranged between the valve body and the ball and comprising an annular member which is coaxial with the longitudinal axis (X-X) and carries a single axial seal housed inside an associated axial seat of the annular member inside which it is partially inserted in order to interfere with the outer surface of the ball;
    a coaxial retaining ring axially constrained to the annular member and interfering in the transverse direction (Y-Y) with a front surface portion of the axial seal in order to retain the latter in the axial direction; and
    springs axially inserted inside corresponding seats of the end flange against which the springs react,
    wherein said axial seal is formed by a plurality of layers of sheets of pure graphite reinforced with a metal strip.

2. The valve according to claim 1, wherein said coaxial retaining ring is removable.

3. The valve according to claim 2, wherein said coaxial retaining ring is constrained to the annular seal-carrying member by means of screws which are axially screwed into the latter.

4. The valve according to claim 1, wherein said annular member has a radial extension with a diameter greater than the diameter of the surface of the ball interfering with the axial seal.

5. The valve according to claim 4, wherein the screws for fixing the coaxial retaining ring for axially retaining the seal are screwed into said radial extension.

6. The valve according to claim 1, wherein the coaxial retaining ring for retaining the axial seal has an annular body with a diameter corresponding to that of the radial extension of the annular member and an outwardly inclined undercut able to be arranged substantially parallel to the tangent of the outer surface of the ball opposite the said undercut.

7. The valve according to claim 1, wherein the metal strip is made of stainless steel.

8. The valve according to claim 1, wherein the metal strip has a thickness of between a few hundredths and a few tenths of a millimeter.

9. The valve according to claim 1, wherein the coaxial retaining ring is housed inside a corresponding axial seat of the seal-carrying member.

10. The valve according to claim 1, wherein the axial seal is able to produce a fluid-tight seal both in the axial direction by means of contact with the outer surface of the ball and with the end wall, parallel to the transverse direction (Y-Y), of the associated axial seat of the annular member against which it makes contact and a cylindrical circular seal along the coaxial annular surface of the same axial seat of the annular member.

11. The valve according to claim 1, wherein the annular member carries radial seals able to interfere with the flanges or the valve body are associated with said annular seal carrying member.

* * * * *